(12) United States Patent
Perner

(10) Patent No.: US 9,707,419 B2
(45) Date of Patent: Jul. 18, 2017

(54) SNAP HOOK

(71) Applicant: D B Industries, LLC, Red Wing, MN (US)

(72) Inventor: Judd J. Perner, Red Wing, MN (US)

(73) Assignee: D B Industries, LLC, Red Wing, MN (US)

( * ) Notice: Subject to any disclaimer, the term of this patent is extended or adjusted under 35 U.S.C. 154(b) by 0 days.

(21) Appl. No.: 14/874,871

(22) Filed: Oct. 5, 2015

(65) Prior Publication Data

US 2016/0101302 A1 Apr. 14, 2016

Related U.S. Application Data

(60) Provisional application No. 62/061,345, filed on Oct. 8, 2014.

(51) Int. Cl.
*F16B 45/02* (2006.01)
*A62B 35/00* (2006.01)

(52) U.S. Cl.
CPC .......... *A62B 35/0037* (2013.01); *F16B 45/02* (2013.01); *Y10T 24/4534* (2015.01); *Y10T 24/45366* (2015.01)

(58) Field of Classification Search
CPC .......... Y10T 24/4534; Y10T 24/45272; Y10T 24/45366; Y10T 24/45346;
(Continued)

(56) References Cited

U.S. PATENT DOCUMENTS

| 370,983 A | 10/1887 | Stahl |
|---|---|---|
| 501,875 A | 7/1893 | Cutter |

(Continued)

FOREIGN PATENT DOCUMENTS

| DE | 42 37 263 A1 | 7/1994 |
|---|---|---|
| DE | 20 2004 003 899 U1 | 5/2004 |

(Continued)

OTHER PUBLICATIONS

International Search Report from PCT/US2015/054380 mailed Jan. 26, 2016 6 pages.
(Continued)

*Primary Examiner* — Robert J Sandy
*Assistant Examiner* — Michael Lee
(74) *Attorney, Agent, or Firm* — Dicke, Billig & Czaja, PLLC

(57) ABSTRACT

A snap hook that includes a body, a gate, a connection link and a breakable fastener is provided. A central portion of the body is positioned between an upper portion and a lower portion. The gate is pivotally coupled proximate the central portion of the body. The gate and the body selectively forming a closed configuration that defines a hook connection passage and an open configuration that provides access to the hook connection passage. An upper end of the connection link is pivotally coupled proximate the central portion of the body. A lower end of the connection link includes a body connection aperture. The breakable fastener couples the lower end of the connection link proximate the lower portion of the body. The breakable fastener is configured to break when a select amount of force is applied to the lower end of the connection link to transfer the force from the lower portion of the body to the central portion of the body.

19 Claims, 10 Drawing Sheets

(58) Field of Classification Search
CPC ......... Y10T 24/45361; Y10T 24/45293; Y10T 24/3485; Y10T 24/3492; Y10T 24/3493; Y10T 24/3488; Y10T 24/3449; Y10T 24/3487; Y10T 24/3489; A62B 35/0037; F16B 45/02
See application file for complete search history.

(56) References Cited

U.S. PATENT DOCUMENTS

| | | | |
|---|---|---|---|
| 705,526 A | 7/1902 | Gray | |
| 741,014 A | 10/1903 | Covert | |
| 761,859 A | 6/1904 | Sweet | |
| 939,727 A | 11/1909 | Maki | |
| 1,062,653 A | 5/1913 | Koons | |
| 1,193,516 A * | 8/1916 | Clarke | B66C 1/36 24/600.1 |
| 1,228,513 A | 6/1917 | Anderson | |
| 1,289,096 A | 12/1918 | Boatright | |
| 1,394,068 A | 10/1921 | Cousins | |
| 1,521,811 A | 1/1925 | Hartbauer | |
| 1,546,208 A | 7/1925 | Cunningham | |
| 1,554,303 A * | 9/1925 | Smith | E21B 19/04 24/600.1 |
| 1,573,444 A * | 2/1926 | Jordan | E21B 19/04 24/599.7 |
| 1,583,347 A | 5/1926 | Frischknecht | |
| 1,598,684 A | 9/1926 | Jensen | |
| 1,626,866 A | 5/1927 | Neilson | |
| 1,669,418 A * | 5/1928 | Lemex | E21B 19/04 24/600.7 |
| 1,682,617 A * | 8/1928 | Jensen | E21B 19/04 24/600.1 |
| 1,687,006 A | 10/1928 | Cornelius | |
| 1,711,346 A | 4/1929 | Greve | |
| 1,711,440 A * | 4/1929 | Baker | E21B 19/04 24/600.7 |
| 1,879,168 A | 9/1932 | Freysinger | |
| 1,949,608 A | 3/1934 | Johnson | |
| 1,964,428 A | 6/1934 | Duffy | |
| 2,490,931 A | 12/1949 | Thompson | |
| 2,577,790 A | 12/1951 | McCormick | |
| 2,764,792 A * | 10/1956 | Mansfield | B63B 21/54 114/230.26 |
| 3,575,458 A | 4/1971 | Crook, Jr. et al. | |
| 3,918,758 A | 11/1975 | Fournier | |
| 4,062,092 A | 12/1977 | Tamada et al. | |
| 4,122,585 A | 10/1978 | Sharp et al. | |
| 4,279,062 A | 7/1981 | Boissonnet | |
| 4,320,561 A | 3/1982 | Müller et al. | |
| 4,333,212 A | 6/1982 | Bibollet | |
| 4,372,016 A | 2/1983 | LaViolette et al. | |
| 4,379,579 A | 4/1983 | Mahan et al. | |
| 4,401,333 A | 8/1983 | Merry | |
| 4,434,536 A | 3/1984 | Schmidt et al. | |
| 4,440,432 A | 4/1984 | Goris | |
| 4,528,728 A | 7/1985 | Schmidt et al. | |
| 4,528,729 A | 7/1985 | Schmidt et al. | |
| 4,539,732 A | 9/1985 | Wolner | |
| 4,546,523 A | 10/1985 | Bailey, Jr. | |
| 4,554,712 A | 11/1985 | Le Beon | |
| 4,621,851 A | 11/1986 | Bailey, Jr. | |
| 4,645,255 A | 2/1987 | Zepf | |
| 4,657,110 A | 4/1987 | Wolner | |
| 4,731,910 A | 3/1988 | Purcell et al. | |
| 4,767,144 A | 8/1988 | Hörnberg | |
| 4,908,913 A | 3/1990 | Mori | |
| 4,977,647 A | 12/1990 | Casebolt | |
| 5,002,420 A | 3/1991 | Loyd | |
| 5,174,410 A | 12/1992 | Casebolt | |
| 5,257,441 A | 11/1993 | Barlow | |
| 5,361,464 A | 11/1994 | Bunnell | |
| 5,687,535 A | 11/1997 | Rohlf | |
| 5,694,668 A | 12/1997 | Rohlf | |
| 5,735,025 A | 4/1998 | Bailey | |
| 6,070,308 A | 6/2000 | Rohlf | |
| 6,161,264 A | 12/2000 | Choate | |
| 6,718,601 B1 | 4/2004 | Choate | |
| 6,832,417 B1 | 12/2004 | Choate | |
| 7,437,806 B2 | 10/2008 | Lin | |
| 7,444,723 B2 | 11/2008 | Lin | |
| 7,636,990 B1 | 12/2009 | Choate | |
| 7,647,677 B2 | 1/2010 | Casebolt | |
| 2002/0121236 A1 | 9/2002 | Besson | |
| 2005/0193531 A1 | 9/2005 | Chang | |
| 2005/0193533 A1 | 9/2005 | Chang | |
| 2008/0022497 A1 | 1/2008 | Thompson | |
| 2008/0022498 A1 | 1/2008 | Griffith | |
| 2008/0120818 A1 | 5/2008 | Belcourt et al. | |
| 2011/0094839 A1 | 4/2011 | Blomberg et al. | |
| 2011/0175385 A1 * | 7/2011 | Buie | B66C 1/36 294/82.2 |

FOREIGN PATENT DOCUMENTS

| | | |
|---|---|---|
| DE | 202004010008 U1 | 9/2004 |
| DE | 20 2011 103 255 U1 | 10/2011 |
| EP | 0 109 163 A1 | 5/1984 |
| FR | 2.108.918 | 5/1972 |
| FR | 2.146.704 | 3/1973 |
| FR | 2820473 A1 | 8/2002 |
| GB | 798247 | 7/1958 |
| GB | 2040253 A | 8/1980 |
| JP | S5740455 A | 3/1982 |
| JP | 07 031687 A | 2/1995 |
| JP | H0824352 U | 1/1996 |

OTHER PUBLICATIONS

"Large Hook & Strap Anchorage Connector—User Instructions", *MSA ROSE*, P/N 10005253, Rev. B, pp. 1-8 (© 1998 Rose Manufacturing Company).

\* cited by examiner

SNAP HOOK

CROSS-REFERENCE TO RELATED APPLICATIONS

This Application claims priority to U.S. Provisional Application Ser. No. 62/061,345, same title herewith, filed on Oct. 8, 2014, which is incorporated in its entirety herein by reference.

BACKGROUND

Various occupations place people in precarious positions at relatively dangerous heights thereby creating a need for fall protection or fall-arresting safety apparatus. Among other things, such apparatus usually include a safety line interconnection between a support structure and a safety harness donned by a person working in proximity to the support structure. A snap hook is commonly used to connect various components. The snap hook needs to provide its function without failure.

For the reasons stated above and for other reasons stated below which will become apparent to those skilled in the art upon reading and understanding the present specification, there is a need in the art for an improved effective snap hook.

SUMMARY OF INVENTION

The above-mentioned problems of current systems are addressed by embodiments of the present invention and will be understood by reading and studying the following specification. The following summary is made by way of example and not by way of limitation. It is merely provided to aid the reader in understanding some of the aspects of the invention.

In one embodiment, a snap hook is provided. The snap hook includes a body, a gate, a connection link and a breakable fastener. The body has an upper portion, a lower portion and a central portion. The central portion is positioned between the upper portion and the lower portion. The gate is pivotally coupled proximate the central portion of the body. The gate and the body selectively forming a closed configuration that defines a hook connection passage and an open configuration that provides access to the hook connection passage. The connection link has an upper end and a lower end. The upper end of the connection link is pivotally coupled proximate the central portion of the body. The lower end of the connection link includes a body connection aperture. The breakable fastener couples the lower end of the connection link proximate the lower portion of the body. The breakable fastener is configured to break when a select amount of force is applied to the lower end of the connection link to transfer the force from the lower portion of the body to the central portion of the body.

In another embodiment, another snap hook is provided. The snap hook includes a body, a gate, a locking member, at least one trigger and a connection link. The body has an upper portion, a lower portion and a central portion. The central portion is positioned between the upper portion and the lower portion. The gate is pivotally coupled proximate the central portion of the body. The gate and body selectively forming a closed configuration that defines a hook connection passage and an open configuration that provides access to the hook connection passage. The locking member selectively holds the gate in relation to the body in the closed configuration. The at least one trigger is configured and arranged to release the locking member from holding the gate in relation to the body in the closed configuration. The connection link has an upper end and a lower end. The upper end of the connection link is pivotally coupled proximate the central portion of the body. The lower end of the connection link includes a body connection aperture. The connection link is positioned to guard the at least one trigger from accidental activation.

In further another embodiment, another snap hook is provided. The snap hook of this embodiment includes a body, a gate, a connection link and a breakable fastener. The body has an upper portion, a lower portion and a central portion. The central portion is positioned between the upper portion and the lower portion. The gate is pivotally coupled proximate the central portion of the body. The gate and body selectively form a closed configuration that defines a hook connection passage and an open configuration that provides access to the hook connection passage. The lock link is operationally coupled to the gate. The at least one trigger is coupled to manipulate the lock link. The connection link has an upper end and a lower end. The upper end of the connection link is pivotally coupled proximate the central portion of the body. The lower end of the connection link includes a body connection aperture. The connection link is positioned to guard the at least one trigger. The breakable fastener couples the lower end of the connection link proximate the lower portion of the body. The breakable fastener is configured to break under a select amount of force to allow the connection link to pivot in relation to the body proximate the central portion of the body.

BRIEF DESCRIPTION OF THE DRAWINGS

The present invention can be more easily understood and further advantages and uses thereof will be more readily apparent, when considered in view of the detailed description and the following figures in which.

In accordance with common practice, the various described features are not drawn to scale but are drawn to emphasize specific features relevant to the present invention. Reference characters denote like elements throughout Figures and text.

DETAILED DESCRIPTION

Figure 1A:
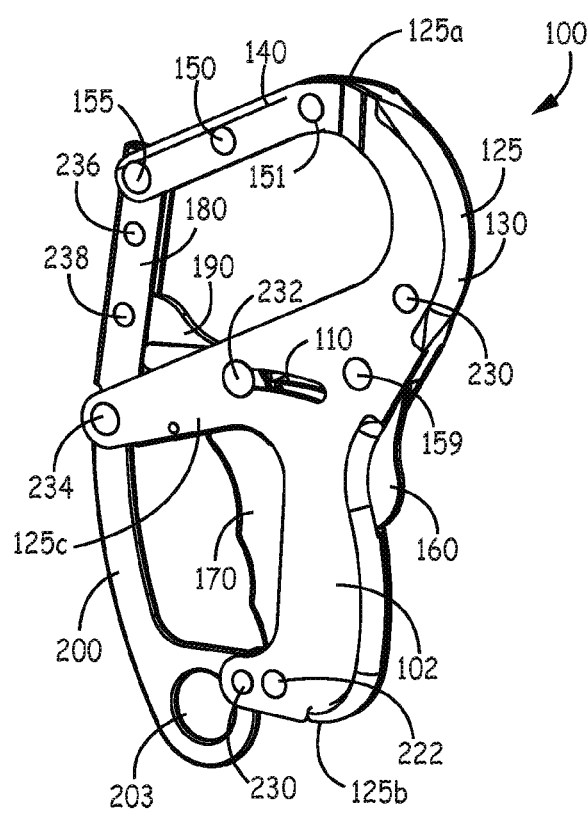
FIG. 1A is a first side perspective view of a snap hook of one embodiment of the present invention.

In the following detailed description, reference is made to the accompanying drawings, which form a part hereof, and in which is shown by way of illustration specific embodiments in which the inventions may be practiced. These embodiments are described in sufficient detail to enable those skilled in the art to practice the invention, and it is to be understood that other embodiments may be utilized and that changes may be made without departing from the spirit and scope of the present invention. The following detailed description is, therefore, not to be taken in a limiting sense, and the scope of the present invention is defined only by the claims and equivalents thereof.

Embodiments of the present invention provide a snap hook that includes a pivoting connecting link that reduces bending stress on the hook body during a fall event by redirecting forces initially directed towards the bottom of the snap hook to a more central pivot point. In one embodiment, the connection link is made from a material that is deformable when a select amount of force is encountered, such as but not limited to, forces encountered during the fall event. The deformation absorbs energy and is used indicate the snap hook has been exposed to forces of a certain level and should not be used again. In another embodiment, a connection link is used as a trigger guard to protect a user's hand while connecting and disconnecting the snap hook. Moreover in one embodiment the trigger guard further protects a trigger mechanism from being accidentally actuated. In another embodiment, the snap hook includes an interlocking gate-nose geometry that increases the hook strength while the snap hook is under tensile tension.

In view of FIGS. 1A through 3, a detailed description of an embodiment of the snap hook 100 is herein provided. The snap hook 100 includes a body 125 that has an upper portion 125a, a lower portion 125b and a central portion 125c that is positioned between the upper portion 125a and the lower portion 125b. The body 125 includes first body plate 102, a second body plate 112, a nose link 140 and a base member 130. The first body plate 102 and a second body plate 112 protect internal components of the snap hook 100. The first body plate 102 has generally an E-shape. The first body plate 102 has an upper end 102a and an opposably positioned lower end 102b as well as a front side 102c and an opposably positioned back side 102d. The front side 102c and back side 102d of the first body plate 102 respectfully extend from the upper end 102a to the lower end 102b. The first body plate 102 further has a mid-portion 102e that is positioned between the upper end 102a and the lower end 102b. The first body plate 102 includes an upper arm 104a positioned at the upper end 102a of the first body plate 102 extending towards the front side 102c of the first body plate 102. The upper arm 104a includes a pair of spaced connection apertures 106a and 106b. The first body plate 102 also includes a lower arm 104b positioned at the lower end 102b of the first body plate 102 extending towards the front side 102c of the first body plate 102. The lower arm 104b includes a fuse aperture 108a and a connection aperture 108b. The connection aperture 108b is spaced from the fuse aperture 108a.

The first body plate 102 further includes a mid-arm 104c that extends from the front side 102c of the first body plate 102 between the upper end 102a and the lower end 102b of the first body plate 102 at generally a central location. Proximate a terminal end of the mid-arm 104c is a pivot aperture 109 that s positioned proximate a central location of the snap hook 100. The mid-arm 104c further includes an unlocking slot 110. The unlocking slot 110 in this embodiment has a slight curvature. Proximate the mid-arm 104c in the mid-portion 102e of the first body plate 102 is connecting aperture 103 and trigger aperture 107. Further, the first body plate 102 includes an extending tab 105 that extends from the backside 102d of the first body plate 102 proximate the mid-portion 102e of the first body plate 102.

The second body plate 112 is a mirror image of the first body plate 102 in this embodiment. The second body plate 112 has an upper end 112a and an opposably positioned lower end 112b as well as a front side 112c and an opposably positioned back side 112d. The front side 112c and back side 112d of the second body plate 112 respectfully extend from the upper end 112a to the lower end 112b. The second body plate 112 further has a mid-portion 112e that is positioned between the upper end 112a and the lower end 112b. The second body plate 112 includes an upper arm 114a positioned at the upper end 112a of the second body plate 112 extending towards the front side 112c of the second body plate 112. The upper arm 114a includes a pair of spaced connection apertures 116a and 116b. The first body plate 112 also includes a lower arm 114b positioned at the lower end 112b of the second body plate 112 extending towards the front side 112c of the second body plate 112. The lower arm 114b includes a fuse aperture 118a and a connection aperture 118b. The connection aperture 118b is spaced from the fuse aperture 118a.

The second body plate 112 further includes a mid-arm 114c that extends from the front side 112c of the second body plate 112 between the upper end 112a and the lower end 112b of the second body plate 112 at generally central location. Proximate a terminal end of the mid-arm 114c is a pivot aperture 119 that is positioned proximate a central location of the snap hook 100. The mid-arm 114c further includes an unlocking slot 120. The unlocking slot 120 in this embodiment has a slight curvature. Proximate the mid-arm 114c in the mid-portion 112e of the second body plate 112 is connecting aperture 113 and trigger aperture 117. Further, the second body plate 112 includes an extending tab 115 that extends from the backside 112d of the second body plate 112 proximate the mid-portion 112e of the second body plate 112.

The snap hook 100 further includes a base member 130. The base member 130 includes an upper end 130a and opposably positioned lower end 130b. Between the upper end 130a and the lower end 130b of the base member 130 is a mid-portion 130c. The base member 130 further includes a front side 130d and an opposably positioned back side 130e. Coupled to the upper end 130a is a nose link 140. In particular, fasteners 150 and 151 (such as but not limited to rivets) received in passages 141 and 143 through the nose link 140 and the upper end 130a of the base member 130 couple the nose link 140 to the base member 130. Further, the upper arm 104a of the first body plate 102 and the upper arm 114a of the second body plate 112 are positioned within the nose link 140 with connection apertures 106a, 106b, 116a and 116b being aligned with passages 141 and 143 of the nose link. Fasteners 150 and 151 received in passages 141 and 143 and connection apertures 106a, 106b, 116a and 116b couple the first body plate 102, the nose link 140, the base member 130 and the second body plate 112 together. The nose link 140 extends from the upper end 130a of the base member 130 from the front side 130d of the base member 130. The nose link 140 further includes a pair of aligned spaced holding passages 152a and 152b that are respectfully positioned in a pair of terminal arm ends 144a and 144b of the nose link 140. A nose rivet catch 155 is received in the aligned spaced holding passages 152a and 152b of the nose link 140. The base member 130 further includes a lower arm 132 that extends out from the lower end 130b of the base member 130. The lower end 130b of the base member 130 includes a base front pivot passage 156. The mid-portion 130c of the base member 130 includes a back trigger slot 136 that extends from the front side 130d to the back side 130e. Aligned base pivot passages 157a and 157b extend through the mid-portion 130c of the base member 130.

A back trigger 160 is partially received within the back trigger slot 136 of the base member 130. The back trigger 160 is generally an inverted C-shape in an embodiment. The back trigger 160 includes an upper back trigger end 160a and an opposably positioned lower back trigger end 160b. The back trigger 160 further includes a mid-portion 160c positioned between the upper back trigger end 160a and the lower back trigger end 160b and a front side 160d and an opposably positioned back side 160e. The back trigger 160 further has an upper arm 162 that extends from the upper back trigger end 160a from the front side 160d and a lower arm 164 that extends from the lower back trigger end 160b from the front side 160d. In addition, the back trigger 160 has a back trigger pivot connection aperture 165 that is posted near the mid-portion and upper back trigger end 160a of the back trigger 160. The back trigger pivot connection aperture 165 is aligned with the aligned base pivot passages 157a and 157b that extend through the mid-portion 130c of the base member 130. A back trigger pivoting fastener 159 is received in the back trigger pivot connection aperture 165 and the aligned base pivot passages 157a and 157b to pivotally couple the back trigger 160 to the base member 130.

A front trigger 170 that has spaced parallel and mirror image front trigger plates 170a and 170b is part of the snap hook 100. The front trigger 170 includes an upper end 172a and an opposably positioned lower end 172b. The front trigger 170 further includes a front side 172c and a back side 172d. The front side 172c includes an engaging connecting plate 172e that connects the front trigger plates 170a and 170b together. The front side 172c of the trigger in the embodiment shown has an ergonomic shape to aid the user in its activation. The front trigger 170 includes guide tabs 174a and 174b that extend from the back side 172d and proximate a mid-portion 172f of front trigger 170. Just below the guide tabs 174a and 174b in the back side 172d of the front trigger 170 are located biasing seat notches 176a and 176b that are designed to engage a first end of a front trigger biasing member 178. Further, proximate the upper end 172a of the front trigger 170 is a first connection passage 173 that passes through both front trigger plates 170a and 170b. Further, a pivot passage 175 located near the lower end 172b of the front trigger 170 passes through both front trigger plates 170a and 170b.

Figure 1B:
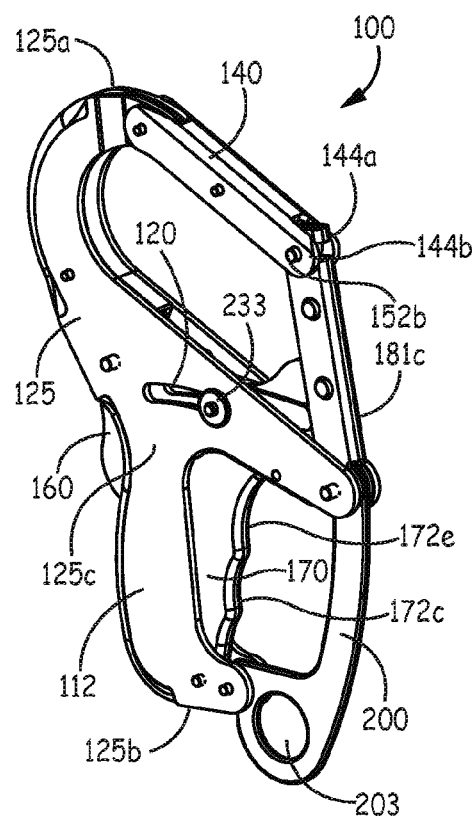
FIG. 1B is a second side perspective view of the snap hook of FIG. 1A.
Figure 2A:
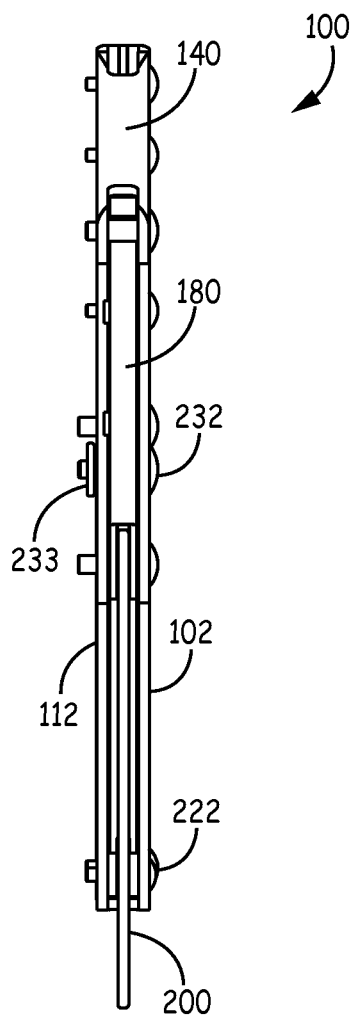
FIG. 2A is a front view of the snap hook of FIG. 1A.
Figure 2B:
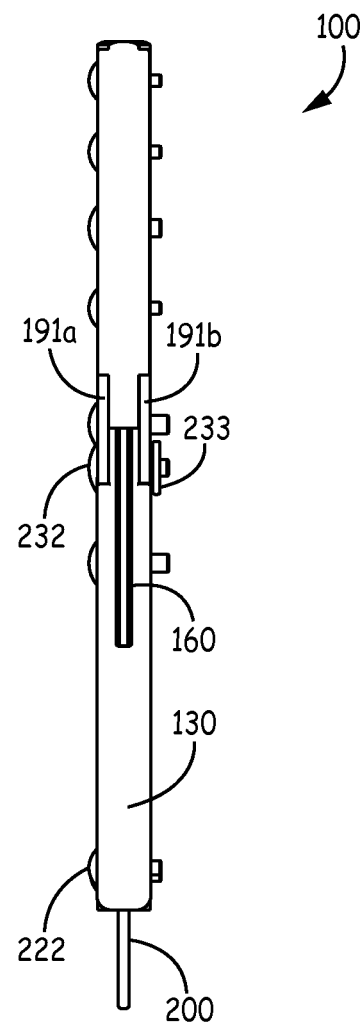
FIG. 2B is a back view of the snap hook of FIG. 1A.

The snap hook 100 further includes a gate 180. The gate 180 in this embodiment includes spaced parallel and mirror image gate plates 181a and 181b. The gate 180 includes an upper end 180a and an opposably positioned lower end 180b. The gate 180 further includes a front side 180c and a back side 180d. The front side 180c includes a connecting plate 181c (as best seen in FIG. 1B) that connects the gate plates 181a and 181b together. The gate 180 includes a gate slot 183 that extends a select distance into the gate 180 from the front side 180c. Further, the gate slot 183 is located proximate the upper end 180a of the gate 180. The gate slot is designed to receive the nose rivet catch 155 coupled to the nose link 140 when the snap hook 100 is in the closed configuration. The nose rivet catch 155 received within the gate slot 183 provides a connection that interlocks the gate 180 proximate the nose link 140. This improves the strength of the snap hook 100 while the snap hook 100 is under tension by distributing some of the load from the base member 130 to the gate 180 and the central rivet 234. The gate 180 also includes a gate pivot aperture path 185 through the gate plates 181a and 181b. The gate 180 further includes spaced aperture paths 187 and 189 that are located in a mid-portion 180e of the gate 180.

The snap hook 100 also includes a locking member to lock the gate 180 in relation to the body in the closed configuration. The locking member in this embodiment includes a lock link 190. The lock link 190 includes a front end 190a and an opposably positioned back end 190b. The lock link 190 also includes an upper end 190c and an opposably positioned lower end 190d. The lock link 190 includes a first lock link aperture 195 proximate the front end 190a of the lock link 190 and a second lock link aperture 193 proximate the back end 190b of the lock link 190. The lock link 190 further includes a pair of spaced lock link arms 191a and 191b that extend from the back end 190b of the lock link 190.

Figure 3:
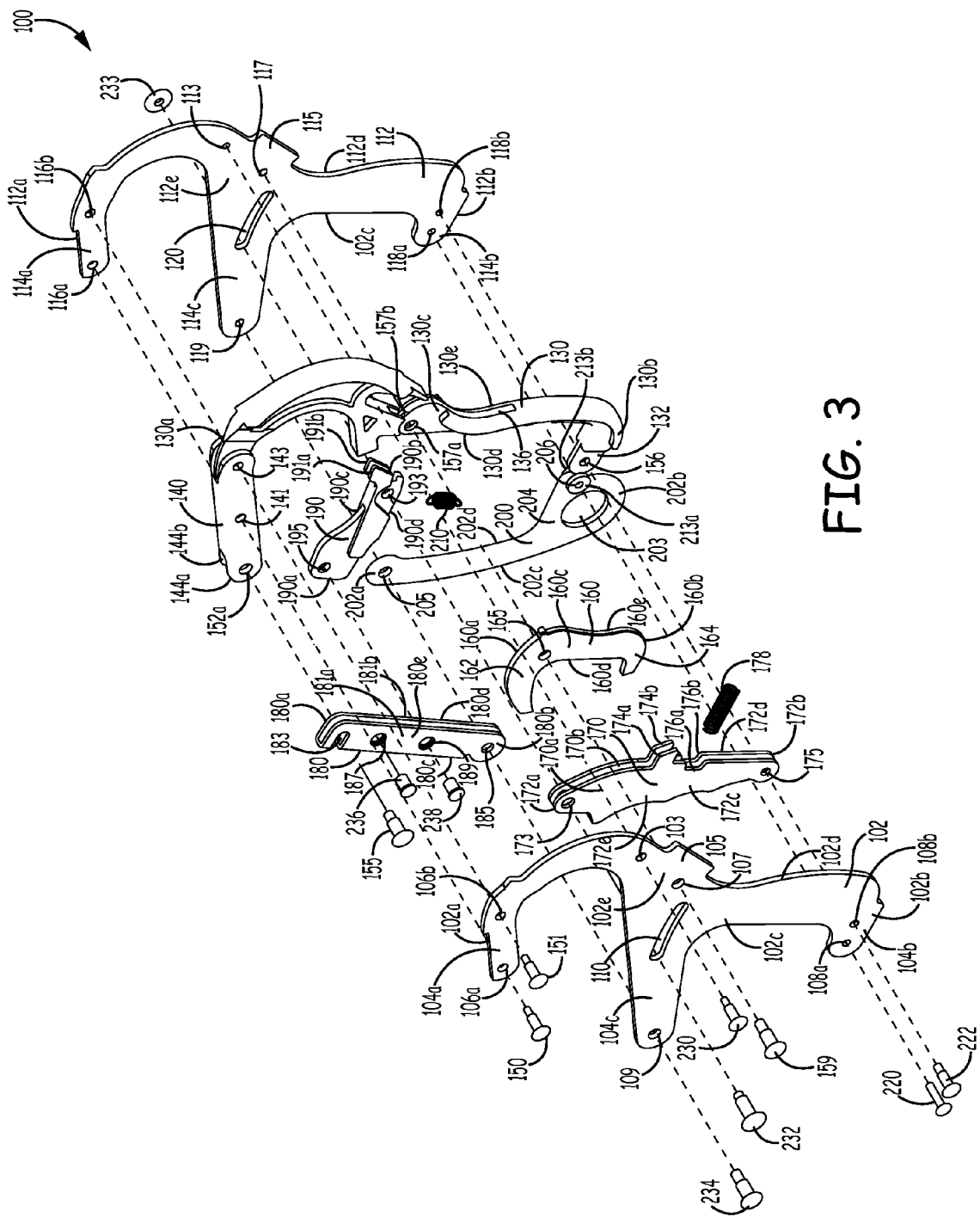
FIG. 3 is a partially unassembled side perspective view of the snap hook of FIG. 1A.

Finally, the snap hook 100 includes a connection link 200. The connection link 200 includes an upper end 202a and an opposably positioned a lower end 202b. The connection link 200 further includes a front side 202c and an opposably positioned back side 202d. The connection link 200 includes a connection aperture 205 that is positioned proximate the upper end 202a of the connection link 200. The connection link 200 includes a connection portion 204 that is positioned near the lower end 202b. The connection portion 204 extends out from the back side 202d of the connection link 200. The connection portion 204 includes a body connection aperture 203 to connect a lifeline or the like (not shown) to the snap hook 100. The connection portion 204 further includes a fuse aperture 207 (best shown in FIG. 7) that is part of a fuse aperture path 206 that passes through the connection portion 204 as illustrated in FIG. 3. Positioned on either side of the fuse aperture path 206 are a first spacer 213a and a second spacer 213b. The spacers 213a and 213b include apertures that form part of the fuse aperture path 206 in this embodiment. The snap hook 100 further includes a front trigger biasing member 178 and a back trigger biasing member 210 which are further described below. The connection link 200 as positioned, further provides a trigger guard protection assembly (as best illustrated in FIG. 1A). That is, the connection link 200 protects a user's hand (not shown) while connecting and disconnecting the snap hook 100 from a structure (not shown). It also prevents the front trigger 170 from being accidentally actuated.

Further description of the assembly of the components is herein provided. The fuse aperture 108a of the first body plate 102, the fuse aperture path 206 of the connection link 200 and the fuse aperture 118a of the second body plate 112 are aligned. A breakable fastener such as, but not limited to, a fuse pin 220 is positioned within the fuse aperture 108a of the first body plate 102, the fuse aperture path 206 of the connection link 200 and the fuse aperture 118a of the second body plate 112. The fuse pin 220 is designed to break under a select amount of force. The front trigger plates 170a and 170b of the front trigger 170 are positioned around the lower arm 132 of the base member 130 such that pivot passage 175 of the front trigger 170 aligns with pivot passage 156 of the base member 130. Further, connection aperture 108b of the first body plate 102 and connection aperture 118b of the second body plate 112 is aligned with pivot passage 175 of the front trigger 170 and pivot passage 156 of the base member 130. A rivet 222 is positioned within connection aperture 108b of the first body plate 102, connection aperture 118b of the second body plate 112, pivot passage 175 of the front trigger 170 and pivot passage 156 of the base member 130. The front trigger 170 pivots on rivet 222. Further, connecting aperture 103 of the first body plate 102 is aligned with connection aperture 113 of the second body plate 112. A rivet 230 is positioned within connecting aperture 103 of the first body plate 102 and the connection aperture 113 of the second body plate 112 to couple the first body plate 102 to the second body plate 112.

The unlocking slot 110 of the first body plate 102 is aligned with first connection passage 173 of the front trigger 170, second lock link aperture 193 of the lock link 190 and unlocking slot 120 of the second body plate 112. Locking rivet 232 is positioned within the unlocking slot 110 of the first body plate 102, first connection passage 173 of the front trigger 170, the second lock link aperture 193 of the lock link 190 and unlocking slot 120 of the second body plate 112. A fastener member 233 is coupled to an end of locking rivet 232 to retain locking rivet 232 within the unlocking slot 110 of the first body plate 102, first connection passage 173 of the front trigger 170, the second lock link aperture 193 of the lock link 190 and unlocking slot 120 of the second body plate 112. The upper end 202a of the connection link 200 is received between the gate plates 181a and 181b such that the connection aperture 205 of the connection link 200 is aligned with the gate pivot aperture path 185 of the gate 180. The pivot aperture 109 of the first body plate 102 is aligned with the gate pivot aperture path 185 of the gate 180, the connection aperture 205 of the connection link 200 and the pivot aperture 119 of the second body plate 112. Central rivet 234 is positioned within the pivot aperture 109 of the first body plate 102, the gate pivot aperture path 185 of the gate 180, the connection aperture 205 of the connection link 200 and the pivot aperture 119 of the second body plate 112 to pivotally couple the connection link 200 to the first and second body plates 102 and 112. A portion of the front end 190a of the lock link 190 is received between the gate plates 181a and 181b of the gate 180 such that the first lock link aperture 195 of the lock link 190 is aligned with the aperture path 189 of the gate 180. Gate rivet 238 is received within the first lock link aperture 195 of the lock link 190 and the aperture path 189 of the gate 180 to rotationally couple the gate 180 to the lock link 190. Further, rivet 236 is received in aperture path 187 of the gate 180.

Figure 4:
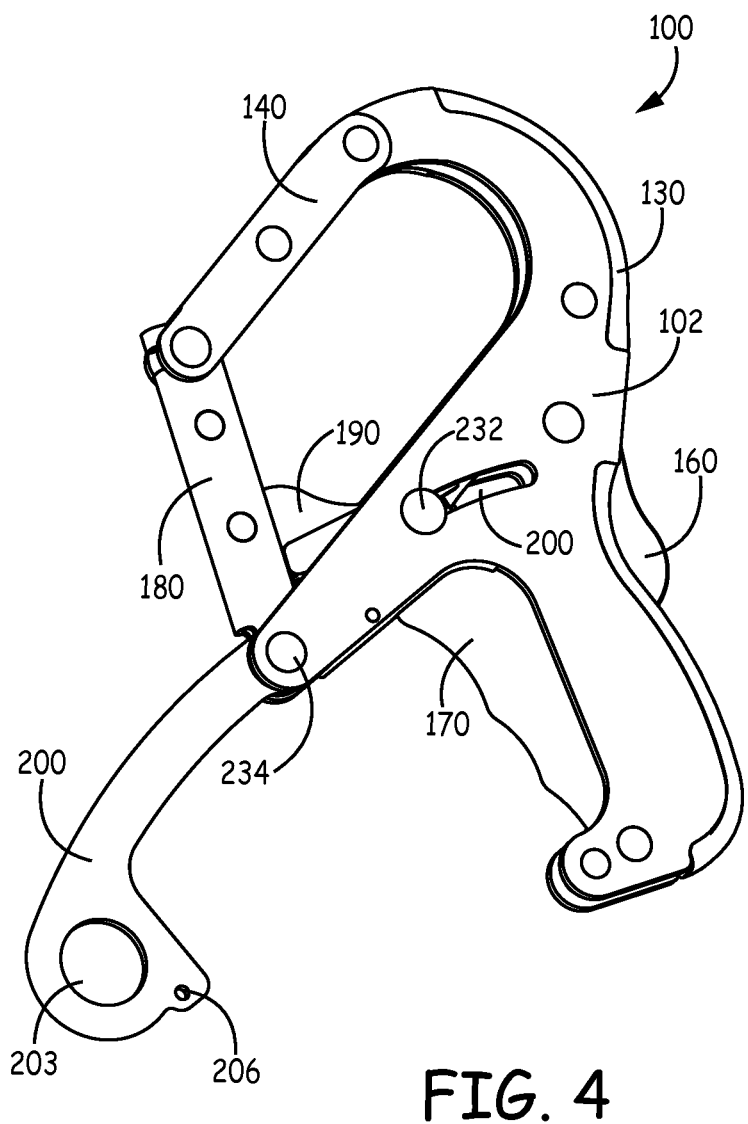
FIG. 4 is a side perspective view of the snap hook of FIG. 1A illustrating the pivot function of the connection hook.

FIG. 4 illustrates that the connection link 200 pivots about central rivet 234 if the fuse pin 220 (not shown in FIG. 4) is broken. That is, even when the fuse pin 220 is broken the connector link 200, which would be connected to a lanyard (not shown) via body connection aperture 203, will still connect a user to whatever the snap hook 100 is connected to. One of the benefits of this design is that the snap hook's body (including the base member 130, the first and second body plates 102 and 112) are subject to less stress during a fall event because forces encountered during a fall event are redirected from proximate a bottom (lower) part of the snap hook 100 to a central pivot point (about central rivet 234).

Figure 5:
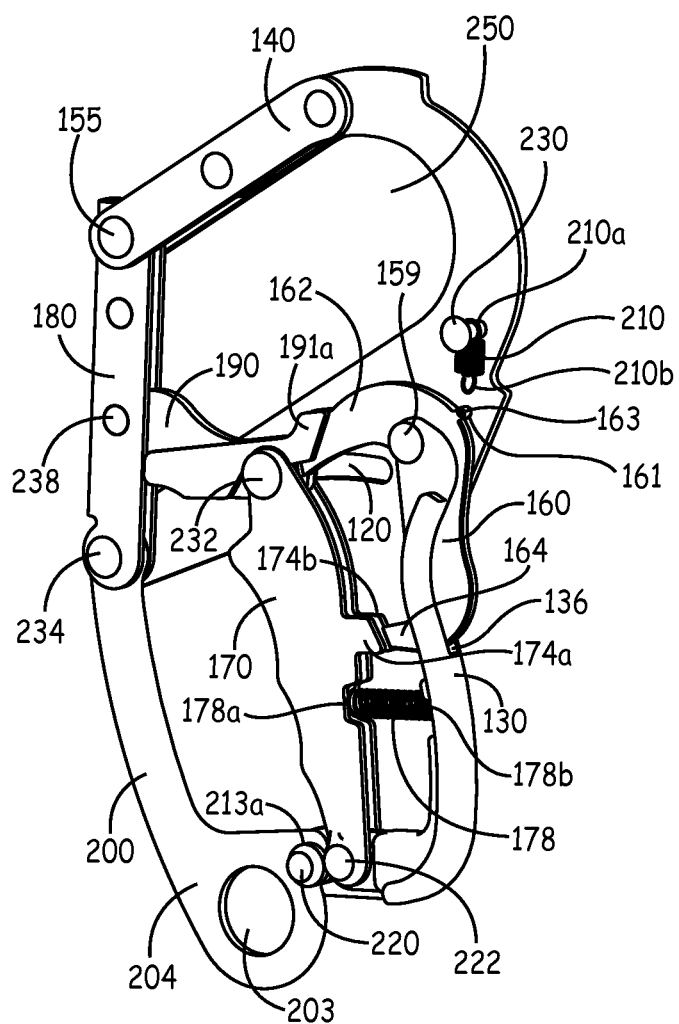
FIG. 5 is a side perspective view of a partial snap hook of FIG. 1A.

Referring to FIG. 5, a partial side view of the snap hook 100 is provided to help show how the components of the snap hook 100 are assembled in an embodiment. In FIG. 5 the first body plate 102 is removed for illustration purposes. The configuration of the snap hook 100 in FIG. 5 is illustrated with the gate 180 closed and the snap hook being in a closed configuration. In this configuration, the snap hook 100 can hold a support device (not shown) within a hook connection passage 250 defined by the gate 180 and the body of the snap hook 100. As illustrated, the back trigger 160 is positioned within the back trigger slot 136 of the base member 130 and pivotally coupled to the base member 130 via the back trigger pivoting fastener 159. The upper arm 162 engages the lock link 190 in the closed configuration as shown. The lower arm 164 of the back trigger 160 is positioned to be selectively received between guide tabs 174a and 174b. This arrangement maintains proper alignment of the back trigger 160 and the front trigger 170 during their activation. The back trigger biasing member 210 has a first end 210a coupled to rivet 230 and a second end 210b engaged in a bias aperture 163 of a lock tab 161 of the back trigger 160. The back trigger biasing member 210 provides a bias force on the back trigger 160 to keep the back trigger 160 engaging the lock link 190 to keep the snap hook 100 in the closed configuration as shown in FIG. 5. As further illustrated in FIG. 5, the lower end 172b of the front trigger 170 is pivotally coupled to the lower arm 132 of the base member 130 via rivet 222. The upper end 172a of the front trigger 170 is pivotally coupled to the lock link 190 via locking rivet 232. Locking rivet 232 rides in unlocking slot 110 in the first body plate 102 (not shown in FIG. 5) and aligned unlocking slot 120 in the second body plate 112. The front trigger biasing member 178 includes a first end 178a that engages the biasing seat notches 176a and 176b of the front trigger 170 and a second end 178b that engages the base member 130. The front trigger biasing member 178 asserts a biasing force on the front trigger 170 such that locking rivet 232 coupled to the upper end 172a of the front trigger 107 is positioned towards a front portion of the respective unlocking slots 110 and 120. In this position the lock link 190 locks the gate 180 shut and the snap hook is in the closed configuration. As further illustrated, a front end 190a of the lock link 190 is pivotally coupled to the gate 180 via gate rivet 238. The lock link 190 prevents the gate 180 from pivoting open about pivot 234 when the snap lock 100 is in the closed configuration.

Figure 6A:
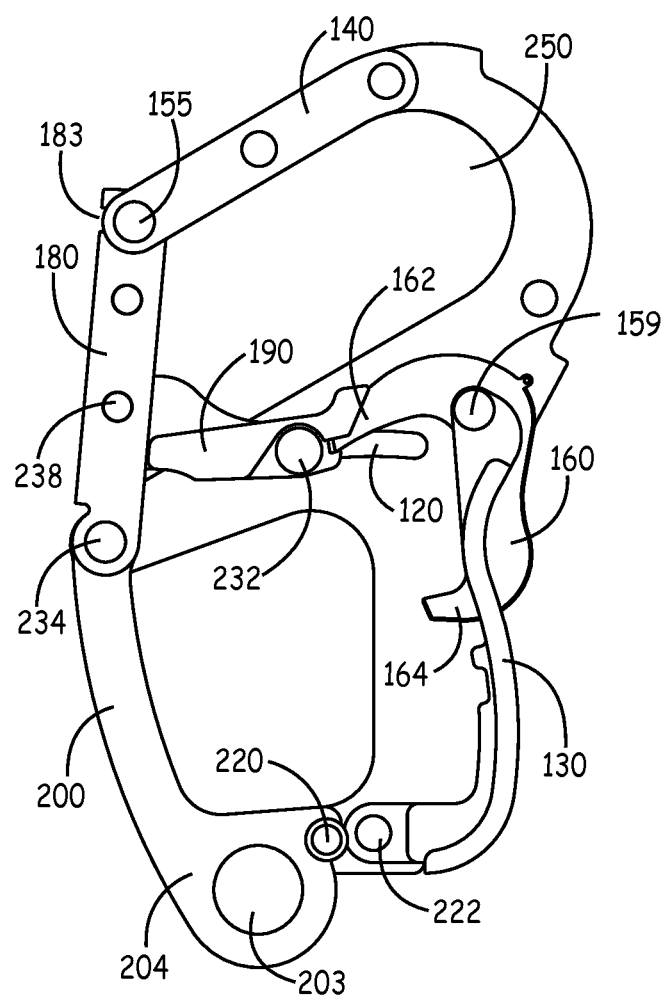
FIG. 6A is a side view of a partial snap hook of FIG. 1A in a closed configuration.
Figure 6B:
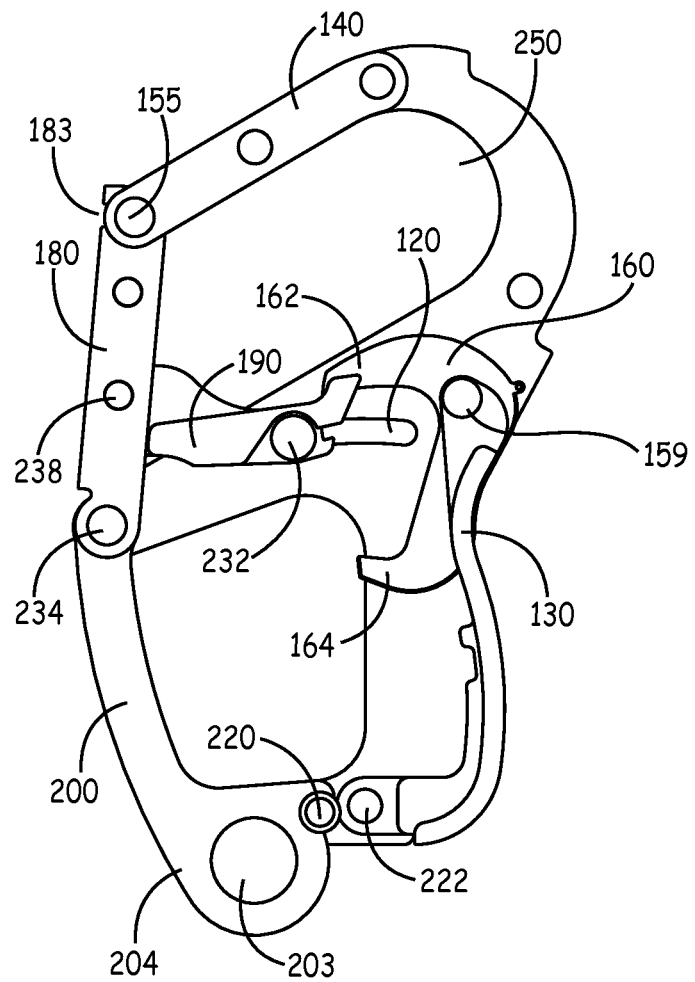
FIG. 6B is a side view of the partial snap hook of FIG. 6A at the start of an unlocking process.
Figure 6C:
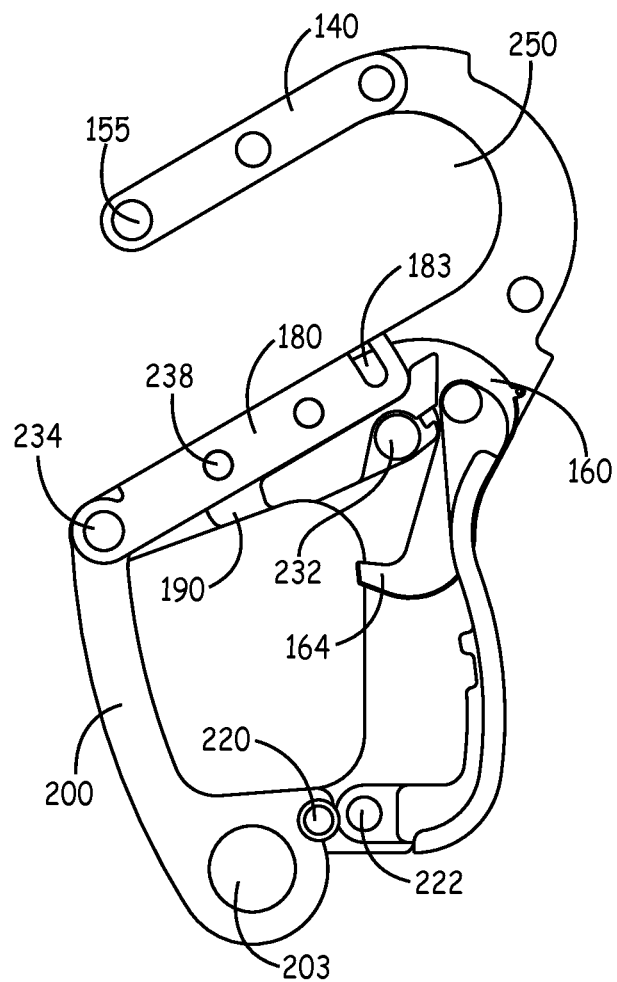
FIG. 6C is a side view of the partial snap hook in FIG. 6A with the snap hook in an open configuration.
Figure 6D:
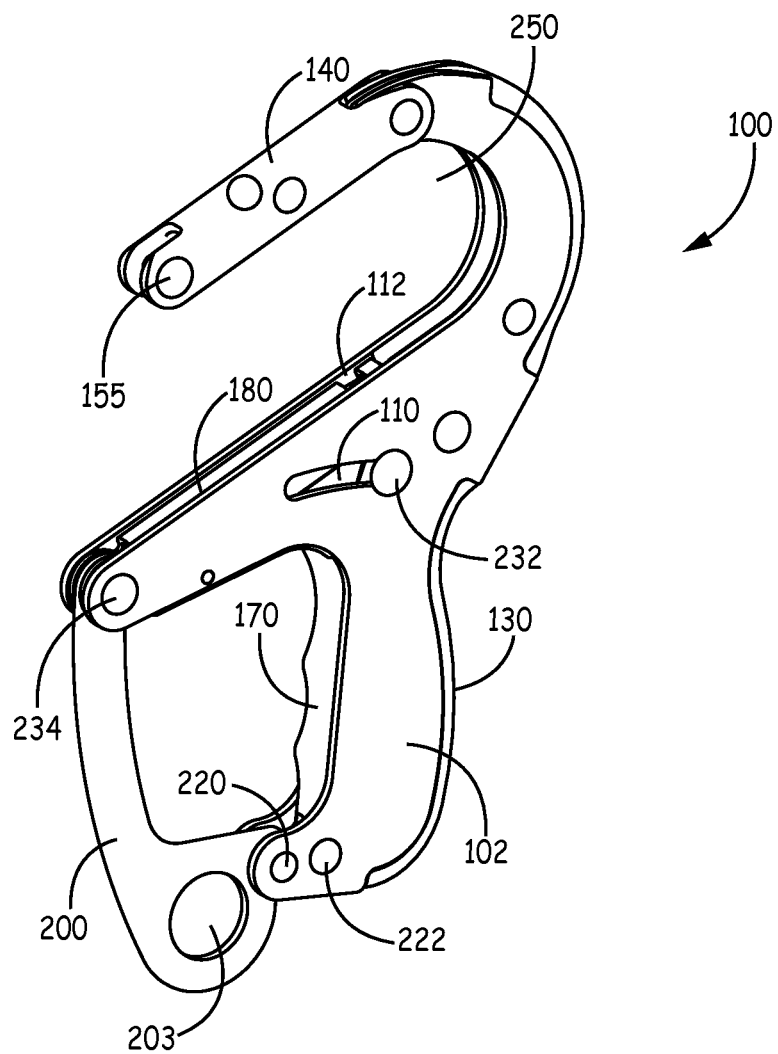
FIG. 6D is a side perspective view of the snap hook of FIG. 1A in an open configuration.

The partial snap hook shown in FIGS. 6A through 6C illustrate how some of the components of the snap hook 100 work together to open the gate 180. FIG. 6A illustrates a side view of a partial snap hook 100. In this view both the first body plate 102 and the front trigger 170 are removed for illustration purposes. In this view, the upper arm 162 of the back trigger 160 is engaged with the lock link 190 to prevent the lock link 190 from moving. As discussed above, the lock link 190 is in turn coupled to the gate 180. Hence, the gate 180 cannot move in this configuration and the snap hook 100 is locked in a closed configuration. FIG. 6B illustrates the back trigger 160 being depressed into back trigger slot 136 of the base body 130. This action pivots the back trigger 160 about the back trigger pivoting fastener 159 therein allowing the upper arm 162 of the back trigger to clear the lock link 190. This action allows the lock link 190 to move. In particular, this action allows locking rivet 232 to move in unlocking slots 110 and 120 of the first and second body plates 102 and 112. The front trigger 170 (not shown in FIG. 6B) also coupled to the locking rivet 232 moves the locking rivet in the respective slots 110 and 120 of the first and second body plates 102 and 112. To move the front trigger 170, as best shown in FIG. 5, a user grasps the front trigger 170 with their fingers and pulls the front trigger 170 towards the base member 130 while the user's palm of their hand is depressing the back trigger 160. Pulling the front trigger 170 causes the front trigger to pivot about rivet 222 and move the locking rivet 232 in the unlocking slots 110 and 120 of the respective first and second body plates 102 and 112. FIG. 6C illustrates the position of the locking rivet 232 after being moved in the unlocking slots 110 and 120 of the respective first and second body plates 102 and 112. Since, the lock link 190 is coupled to both the locking rivet 232 and gate 180 via gate rivet 238, the gate 180 pivots about central rivet 234 and the gate slot 183 of the gate 180 clears the nose rivet catch 155 in the nose link 140 and provides an open path to the snap hook's 100 hook connection passage 250. This is an open configuration of the snap hook 100. The open configuration of the snap hook 100 is further illustrated in the side perspective view of FIG. 6D. As illustrated, the gate 180 can be rotated about central rivet 234 so that is positioned between the first body plate 102 and the second body plate 112. Moreover, the gate 180 is completely flush with the first and second body plates 102 and 112. Hence, an opening to the hook connection passage 250 of the snap hook 100 is smooth and free of protrusions that could get caught while connecting or disconnecting the snap hook 100. Also illustrated in FIG. 6D is that the locking rivet 232 has been moved in the unlocking slot 110 of the first body plate 102 all the way towards the base member 130. Moreover, the positioning of the front trigger 170 and the back trigger 160 provides a snap hook 100 that is more ergonomic than traditional snap hooks because it allows a user to maintain proper hand position and movement while connecting and disconnecting the snap hook 100 from a support structure or the like.

Figure 7:
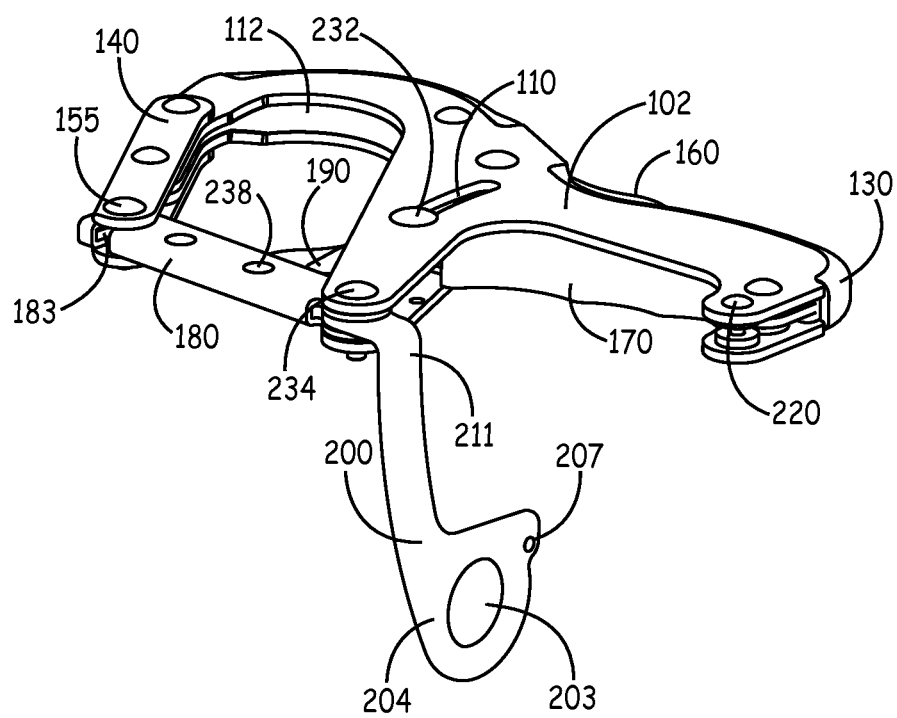
FIG. 7 is a front perspective view of the snap hook of FIG. 1A after a fall event has occurred.

One feature of the snap hook 100 as briefly discussed above is the design of the connection link 200. As discussed in regards to FIG. 4, a fuse pin 220 coupling the connection portion 204 of the connection link 200 is designed to break under a select amount of force. For example, if a user that is coupled to the body connection aperture 203 via lanyard or lifeline falls, the force of the fall on the connection link 200 will cause the fuse pin 220 to break therein releasing the connection portion 204 of the connection link 200 from the first and second body plates 102 and 112. This reduces bending stresses on the snap hook 100 by redirecting the force from proximate the bottom of the snap hook 100 to a central pivot point (i.e. about central rivet 234). Another related feature is illustrated in FIG. 7. In one embodiment, the connection link 200 is designed to deform when exposed to fall forces, or the like, when the fuse pin 220 breaks. This is illustrated as a bend 211 in the connection link in FIG. 7. This deformation of the connection link 200 visually conveys that the snap hook 100 has been exposed to forces, such as but not limited to, forces from a fall event and hence the snap hook 100 should not be used again. In one embodiment the connection link 200 is made for a high strength and ductile material that undergoes permanent deformation during a fall event but will not fracture or separate.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

The invention claimed is:

1. A snap hook comprising:
 a body having an upper portion, a lower portion and a central portion, the central portion being positioned between the upper portion and the lower portion, the body comprising a first body plate, a second body plate, and a nose link, the first body plate having a first upper arm, a first lower arm and a first mid-arm positioned between the first upper arm and the first lower arm, the second body plate having a second upper arm, a second lower arm and a second mid-arm positioned between the second upper arm and the second lower arm, the nose link coupled to the first upper arm of the first body plate and the second upper arm of the second body plate proximate the upper portion of the body, and
 a nose rivet catch coupled to the nose link to receive a gate slot of a gate when the gate and the body are in the closed configuration;
 the gate pivotally coupled proximate the central portion of the body, the gate and body selectively forming a closed configuration that defines a hook connection passage and an open configuration that provides access to the hook connection passage;
 a connection link having an upper end and a lower end, the upper end of the connection link pivotally coupled proximate the central portion of the body, the lower end of the connection link including a body connection aperture; and
 a breakable fastener coupling the lower end of the connection link proximate the lower portion of the body, the breakable fastener configured to break when a select amount of force is applied to the lower end of the connection link and release the lower end of the connection link from the lower portion of the body to redirect the select amount of force from the lower portion of the body to the central portion of the body.

2. The snap hook of claim 1, wherein the connection link is deformable when exposed to the select amount of force.

3. The snap hook of claim 1, further comprising;
 a locking member to selectively hold the gate in relation to the body in the closed configuration; and
 at least one trigger configured and arranged to release the locking member.

4. The snap hook of claim 3, further comprising:
 the connection link positioned to guard the at least one trigger from an accidental activation.

5. The snap hook of claim 1, further comprising:
 at least one lock link coupled to the gate;
 a back trigger selectively engaging the at least one lock link, the back trigger being configured and arranged to disengage the at least one lock link when activated; and
 a front trigger configured and arranged to move the at least one lock link when the back trigger is disengaged from the at least one lock link and the front trigger is activated.

6. The snap hook of claim 5, wherein the connection link is positioned to prevent the accidental activation of the front trigger.

7. The snap hook of claim 1, further comprising:
 the gate having a gate slot; and
 a nose rivet catch coupled to the body, the gate slot receiving the nose rivet catch when the gate and the body are in the closed configuration.

8. The snap hook of claim 1, further comprising;
 a lock link slidably coupled between the first mid-arm of the first body plate and the second mid-arm of the second body plate, the lock link pivotally coupled to the gate;
 a back trigger pivotally coupled between the first body plate and the second body plate proximate the central portion of the body, the back trigger having a portion that selectively engages the lock link to prevent the lock link from slidably moving until the back trigger is activated; and
 a front trigger pivotally coupled between the first body plate and the second body plate proximate the central portion of the body, the front trigger configured and arranged to slidably move the lock link once the back trigger is activated.

9. A snap hook comprising:
a body having an upper portion, a lower portion and a central portion, the central portion being positioned between the upper portion and the lower portion;
a gate pivotally coupled proximate the central portion of the body, the gate and body selectively forming a closed configuration that defines a hook connection passage and an open configuration that provides access to the hook connection passage;
a locking member to selectively hold the gate in relation to the body in the closed configuration;
at least one trigger configured and arranged to release the locking member from holding the gate in relation to the body in the closed configuration; and
a connection link having an upper end and a lower end, the upper end of the connection link pivotally coupled proximate the central portion of the body, the lower end of the connection link including a body connection aperture, the connection link being positioned to guard the at least one trigger from an accidental activation.

10. The snap hook of claim 9 further comprising:
a breakable fastener coupling the lower end of the connection link proximate the lower portion of the body, the breakable fastener configured to break under a select amount of force to allow the connection link to pivot in relation to the body proximate the central portion of the body.

11. The snap hook of claim 10, wherein the connection link is deformable when exposed to the select amount of force.

12. The snap hook of claim 9, further comprising:
the locking member including a lock link; and
the at least one trigger including,
a back trigger selectively engaging the lock link, the back trigger being configured and arranged to disengage the lock link when activated, and
a front trigger configured and arranged to move the lock link when the back trigger is disengaged from the lock link and the front trigger is activated, the connection link being positioned to prevent the accidental activation of the front trigger.

13. The snap hook of claim 12, further comprising:
a back trigger biasing member configured and arranged to place a bias force on the back trigger to selectively engage the lock link; and
a front trigger biasing member configured and arranged to place a biasing force on the front trigger to counter movement of the front trigger.

14. The snap hook of claim 9, the body further comprising;
a first body plate having a first upper arm, a first lower arm and a first mid-arm positioned between the first upper arm and the first lower arm;
a second body plate having a second upper arm, a second lower arm and a second mid-arm positioned between the second upper arm and the second lower arm;
a nose link coupled to the first upper arm of the first body plate and the second upper arm of the second body plate proximate the upper portion of the body; and
a nose rivet catch coupled to the nose link to receive a gate slot of the gate when the gate and body are in the closed configuration.

15. A snap hook comprising:
a body having an upper portion, a lower portion and a central portion, the central portion being positioned between the upper portion and the lower portion;
a gate pivotally coupled proximate the central portion of the body, the gate and body selectively forming a closed configuration that defines a hook connection passage and an open configuration that provides access to the hook connection passage;
a lock link operationally coupled to the gate;
at least one trigger coupled to manipulate the lock link;
a connection link having an upper end and a lower end, the upper end of the connection link pivotally coupled proximate the central portion of the body, the lower end of the connection link including a body connection aperture, the connection link being positioned to guard the at least one trigger; and
a breakable fastener coupling the lower end of the connection link proximate the lower portion of the body, the breakable fastener configured to break under a select amount of force to allow the connection link to pivot in relation to the body proximate the central portion of the body.

16. The snap hook of claim 15, wherein the at least one trigger further comprises:
a back trigger selectively engaging the lock link, the back trigger being configured and arranged to disengage the lock link when activated;
a back trigger biasing member configured and arranged to place a bias force on the back trigger to selectively engage the lock link;
a front trigger configured and arranged to move the lock link when the back trigger is disengaged from the lock link and the front trigger is activated; and
a front trigger biasing member configured and arranged to place a biasing force on the front trigger to counter movement of the front trigger.

17. The snap hook of claim 15, further comprising:
the gate having a gate slot; and
a nose rivet catch coupled to the body, the gate slot receiving the nose rivet catch when the gate and the body are in the closed configuration.

18. The snap hook of claim 15, wherein the connection link is deformable when exposed to the select amount of force.

19. The snap hook of claim 15, wherein the body further comprises:
a first body plate having a first upper arm, a first lower arm and a first mid-arm positioned between the first upper arm and the first lower arm; and
a second body plate having a second upper arm, a second lower arm and a second mid-arm positioned between the second upper arm and the second lower arm, the lock link slidably coupled between the first and second body plate.

* * * * *